United States Patent [19]

Kou et al.

[11] 4,452,090
[45] Jun. 5, 1984

[54] ULTRASONIC FLOWMETER

[75] Inventors: Abraham H. Kou; Michael G. Busby, both of Madison; Errol E. Polenske, Sun Prairie; Wilfried R. Peickert, Madison, all of Wis.

[73] Assignee: Airco, Inc., Montvale, N.J.

[21] Appl. No.: 379,240

[22] Filed: May 17, 1982

[51] Int. Cl.³ .............................................. G01F 1/66
[52] U.S. Cl. ................................................. 73/861.28
[58] Field of Search ............ 73/861.27, 861.28, 861.29

[56] References Cited

U.S. PATENT DOCUMENTS 2,724,269 11/1955 Kalmus ............................ 73/861.28
2,991,650 7/1961 Katzenstein et al. ............. 73/861.28

Primary Examiner—Herbert Goldstein
Attorney, Agent, or Firm—Roger M. Rathbun; Larry R. Cassett

[57] ABSTRACT

An ultrasonic flowmeter which measures gas velocity including a pair of ultrasonic transducers oppositely located around a conduit at a predetermined angle to the flow direction. Each transducer alternates between acting as a transmitter and a detector of ultrasonic frequencies, thus as one transducer transmits, the other receives. A measurement is made of the time of flight of the ultrasonic signal between the transmitter transducer and the receiver transducer and a microcomputer calculates the velocity of the gas by a known mathematical relationship utilizing the difference between the time of flight of the ultrasonic signals traveling upstream and those traveling downstream. The time of flight is determined by the phase shift or difference in phase angle between the signal at the transmitter transducer and the signal detected by the receiver transducer. To prevent ambiguity arising when the phase angle difference exceeds 360°, the microcomputer periodically determines, by taking into account the differing gases and density thereof being measured, a zero flow phase by calculating an averaged value phase angle of the ultrasonic signals in both the upstream and downstream directions. When that average phase angle approaches a predetermined limit, the microcomputer shifts the phase reference to a new value, the effective overall phase shift can thus exceed 360°, but the microcomputer will still reflect that difference in phase angle and thus, the time of flight of the ultrasonic signals.

5 Claims, 4 Drawing Figures

ULTRASONIC FLOWMETER

BACKGROUND OF THE INVENTION

The present invention relates to ultrasonic flowmeters of the type that measure time of flight of an ultrasonic signal transmitted and received alternately between a pair of oppositely disposed transducers.

Various types of flowmeters have been utilized for clinical applications, that is, for the measurement of the velocity of gases flowing within a flow system administering oxygen, nitrous oxide and an anesthetic agent to a patient. After an accurate flow velocity is obtained, various other parameters necessary to properly monitor the gases to and from a patient are readily calculated, including tidal volume, breathing rates and the like.

Such flowmeters have included vortex-shedding type, rotameters featuring various shaped rotating vanes or blades, hot wire anemometers, but all have certain disadvantages due to the particular need for accuracy over various flow ranges and in the presence of a particular environment.

Since relative low pressures are experienced in the patient's breathing circuit, the flowmeter must be designed so as to present a minimum resistance to breathing and introduce minimal pressure drop in the system. Further qualifications of such flowmeters are that they must be easily cleanable or, in the alternative, be isolated completely from the flow of gas in the patient circuit to prevent cross-contamination between patients. A relatively fast response time is needed so that attending personnel can keep an accurate and instantaneous record of the conditions of gases supplied to or from the patient. As such, therefore, the flowmeter should also have bidirectional capability.

The conditions in a patient circuit also make the task of such flowmeters difficult, the density of the gas stream is subject to changes as the concentration of anesthetic gases is changed and the actual gas stream makeup is variable, i.e., the flow velocity must be determinable both in the presence and in the absence of various chemical substances and gases.

One viable solution to the aforementioned difficulties in operating conditions has been the use of ultrasonics in flowmeters. Ultrasonic transducers are commercially available and are capable of acting both as transmitters and receivers. Such flowmeters may be of the single transducer type utilizing Doppler frequency shift measurement or time-of-flight measurement which utilize more than one transducer and measure the actual time elapsed as the transmitted signal travels from one transducer to the other. The former approach may have some inherent disadvantages, in that it does not measure a time average velocity but may interpret peak velocities. Also, the Doppler technique requires a flow media that is an efficient reflector of the acoustic energy and such is not normally the case in patient breathing circuits.

Accordingly, the latter principal has been proposed and used for measuring flow velocity in patient circuits. See, for example, the article by Plaut and Webster entitled "Ultrasonic Measurement of Respiratory Flow, IEEE Transactions on Biomedical Engineering," Vol. BME-27, No. 10, October 1980, and the flowmeter relies upon the principal that velocity of the fluid medium itself has an effect on the time of flight of the ultrasonic pulse. The sound takes longer from transmitter to receiver when traveling upstream in the flow medium as when traveling downstream, therefore by placing the transducers opposite each other about the flow path of the gas to be measured, but at an angle to the mean flow path, one can derive both an upstream component and a downstream component.

In the equation $$u = \frac{\pi L f (\Delta\phi_u - \Delta\phi_d)}{(\Delta\phi_u + 2n\pi)(\Delta\phi_d + 2n\pi)}$$

as derived by Plaut and Webster in the aforementioned publication, it is possible to measure the shift in phase angle between the ultrasonic signal emitted by the transmitter transducer and the signal detected by the receiver transducer and thus obtain an accurate analysis of the transit time of the ultrasonic signal traveling therebetween.

One difficulty, however, as expressed by Plaut and Webster, is the inherent ambiguity when the phase angle difference exceeds 360°. Normally, to measure the phase angle shift, one establishes a phase reference at zero flow and measures the shift recognized by the receiving transducer. When that phase shift exceeds 360° the flowmeter cannot readily distinguish the true phase angle shift and therefore the result is ambiguous.

As a practical example, it is known that gas density affects sound velocity and in clinical applications, it is common to have a gas stream to be analyzed that contains both air and nitrous oxide. The sound velocity of air at 20° C. is 342 meters/sec. and of nitrous oxide is 273 meters/sec. For a separation between transmitter transducer and receiving transducer of 25 mm or greater, the zero flow phase shift at 100 kHz is at least 660° and is thus beyond the capability of present ultrasonic flowmeter systems, using the phase measurement approach.

SUMMARY OF THE INVENTION

The ultrasonic flowmeter of the present invention utilizes a pair of oppositely disposed transducers arranged about the conduit through which the gas flows to be measured. As described with respect to the prior art, the present flowmeter measures direct time of flight by means of phase shift in both the upstream and the downstream directions. The ultrasonic transducers are located at a tilt angle to the mean flow direction of the measured gas and that angle $\theta$ thus changes somewhat the equation of Plaut and Webster to the following:

$$u = \frac{\pi L f (\Delta\phi_u - \Delta\phi_d)}{\cos\theta(\Delta\phi_u + 2n\pi)(\Delta\phi_d + 2n\pi)}$$

by introducing the cosine function of the tilt angle.

In the present invention, however, the difficulty with phase ambiguity occurring upon a phase shift in excess of 360° has been solved by utilizing a "floating reference phase" where the reference phase, from which the phase shift is measured, is determined and set by the microcomputer and therefore can be changed as necessary in the event the gas composition causes an effective flow phase shift in excess of 360°.

To accomplish this technique, the microcomputer monitors the status of the present zero flow phase by determining an average value of $\Delta\phi_u$ and $\Delta\phi_d$, thus eliminating the effect of the gas velocity on the phase shift. The microcomputer thus knows the zero flow phase as determined by the gas composition within the conduit and, as that zero flow phase approaches a predetermined limit, i.e. 90° or 270°, the computer alters the phase reference to a new position to avoid the 360° ambiguity. In the preferred embodiment, the timer clock is divided into a plurality of phases and the microcomputer can select the correct phase to be used as a phase reference upon determining the zero flow phase for the particular gas concentration at that time and, at the same time, keep track of the phase reference changes so that the integer portion ($2 n\pi$) can be continually corrected for an umlimited shift in phase angle.

DESCRIPTION OF THE PREFERRED EMBODIMENT

Figure 1:
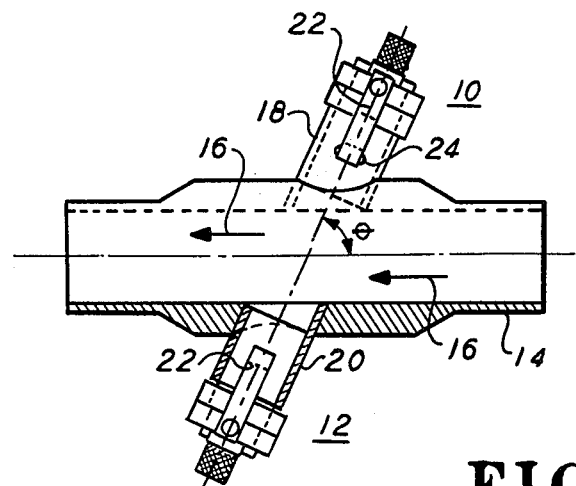
FIG. 1 is a side view, partly in cross section, showing a pair of transducers mounted on a conduit containing the gas being measured.

Referring now to FIG. 1, there is shown a side view, partly in cross-section of a pair of ultrasonic transducer assemblies 10 and 12 oppositely mounted on a conduit 14 through which moves the particular gas to be measured. In FIG. 1, arrows 16 depict the direction of the gas flow through conduit 14.

The transducer assemblies 10 and 12 are contained within cylindrical walls 18, 20 respectively which extend outwardly from the conduit 14 and are in communication with the flow of gas therein. As shown, the cylindrical walls 18 and 20 are disposed opposite and coaxial to each other and have an axis that meets the main axis of the path of gas flowing through conduit 15 at an angle $\theta$. In the preferred embodiment, that angle $\theta$ is approximately 60° for a spacing or distance between the transducer assemblies 10 and 12 of about 1.06 inches. The cylindrical walls 18 and 20 provide mounting means for the transducer assemblies 10 and 12 so as to keep the transducer assemblies 10 and 12 out of the main flow of the gas in conduit 14. A minor dead space is created by the use of cylindrical walls 18 and 20, however such causes minor, if any, inaccuracy in making flow determinations. By recessing transducer assemblies 10 and 12 as shown, they present no obstruction to the normal flow of gas through conduit 14 and, therefore, introduce negligible flow resistance.

The actual mounting of transducer assemblies 10 and 12 within cylindrical walls 18 and 20 may be by a wide variety of means, however, as shown, a pair of releasable clips 22 (only one of each pair being shown) can be mounted on the transducer assemblies 10 and 12 and clip into suitable recesses 24 formed in the exterior surface of each of the cylindrical walls 18 and 20. The transducer assemblies 10 and 12 are thus readily removable from the cylindrical walls 18 and 20 for cleaning, replacement or the like.

Figure 2:
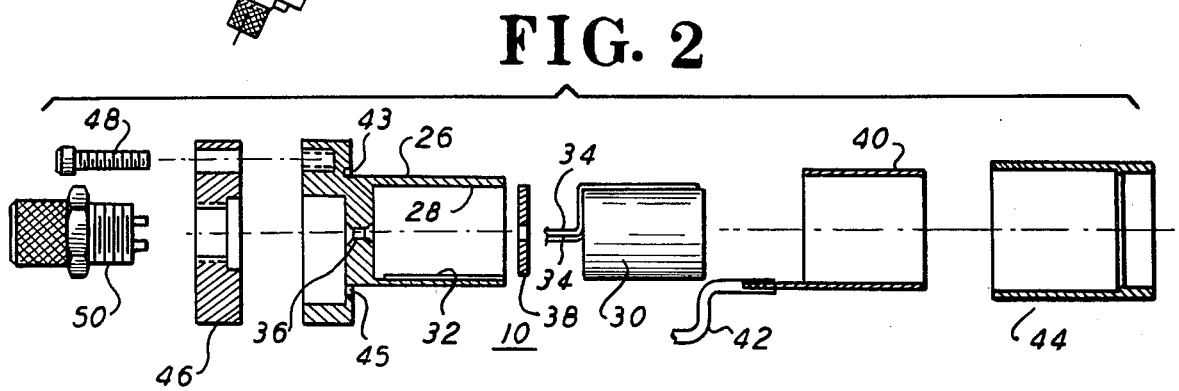
FIG. 2 is an exploded view of an ultrasonic transducer used with the present invention.

Turning now to FIG. 2, there is shown an exploded view of one of the transducer assemblies. In the explanation, transducer assemby 10 will be detailed, however, it is noted that both transducer assemblies 10 and 12 are similarly constructed for positioning within cylindrical walls 18 and 20.

The transducer assembly 10 comprises a housing 26 having a cylindrically shaped opening 28 which tightly receives the transducer 30. The transducer 30 can be obtained commercially and one suitable model is Channel Industries 5500 II having a resonant frequency of about 100 kHz and being about 0.5 inches long with a diameter of about 0.375 inches. A plurality of silicon rubber rails 32, one of which is shown, extend along the length of cylindrically shaped opening 28 and serve to provide acoustic decoupling to isolate the transducer 30 acoustically from the housing 26.

Suitable electrical lead wires 34 from both surfaces of the transducer 30 may be led through opening 36 in the housing 26 for outside electrical connections. Further acoustic decoupling is provided by a silastic pad 38 which separates transducer 30 from the rear surface of cylindrically shaped opening 28. Grounding of the aluminum housing 26 also serves to provide electrostatic shielding between the two transducers used with this invention.

Surrounding the outer cylindrical surface of the housing 26 is fitted a film heater 40 having electrical wires 42 for connection to a source of electricity. The film heater 40 retains the temperature of transducer 30 at about 40° C. to prevent water condensation on any exposed surface of transducer 30.

Covering the film heater 40 is a sleeve 44 which protects the film heater 40 and retains the film heater 40 in good thermal contact with the transducer 30. When assembled, the sleeve 44 fits within annular groove 43 formed in the housing 26 and electrical wires 42 are lead through an aperture 45.

A cap 46 for various electrical connections is secured to housing 26 by means such as cap screws 48 and a coaxial connector 50 is mounted on the cap 46 to provide external connections for the transducer 30 and film heater 40.

Figure 4:
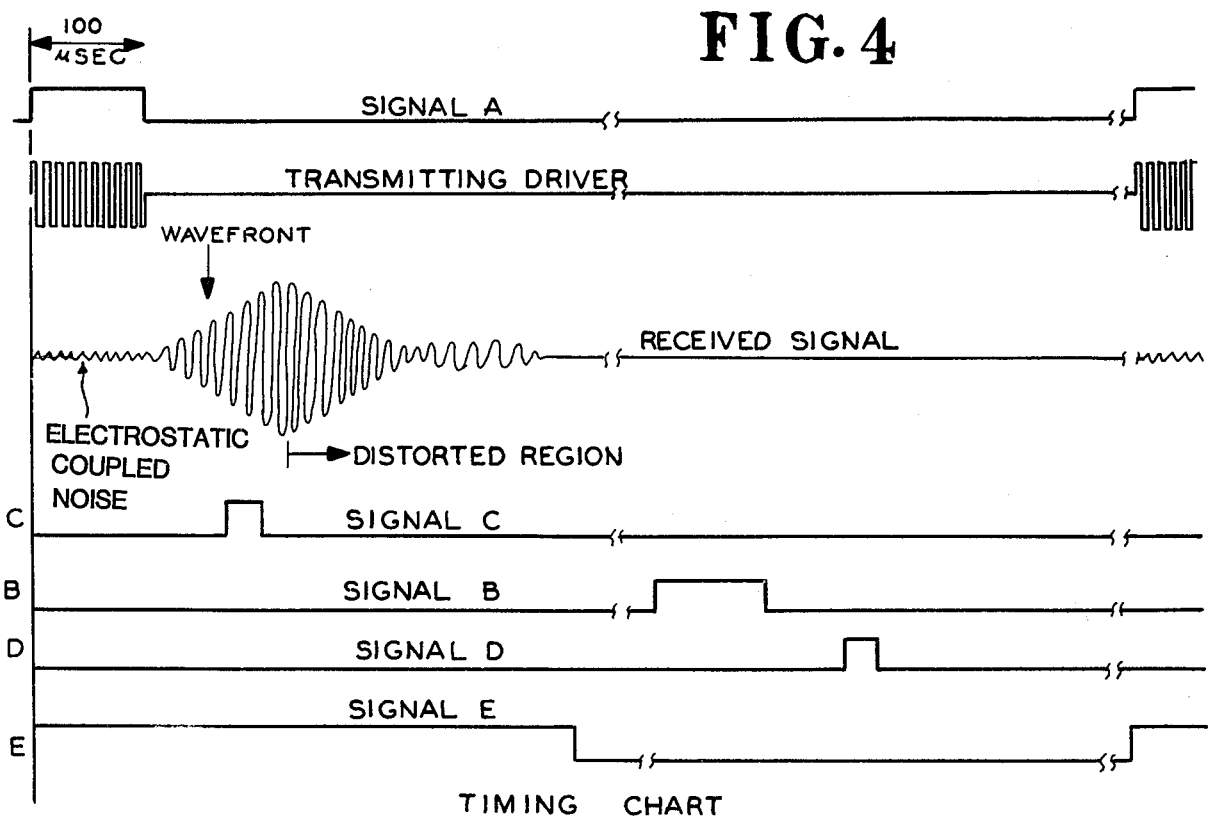
FIG. 4 is illustrative of various signal wave forms at locations in the circuitry shown in FIG. 3.
Figure 3:
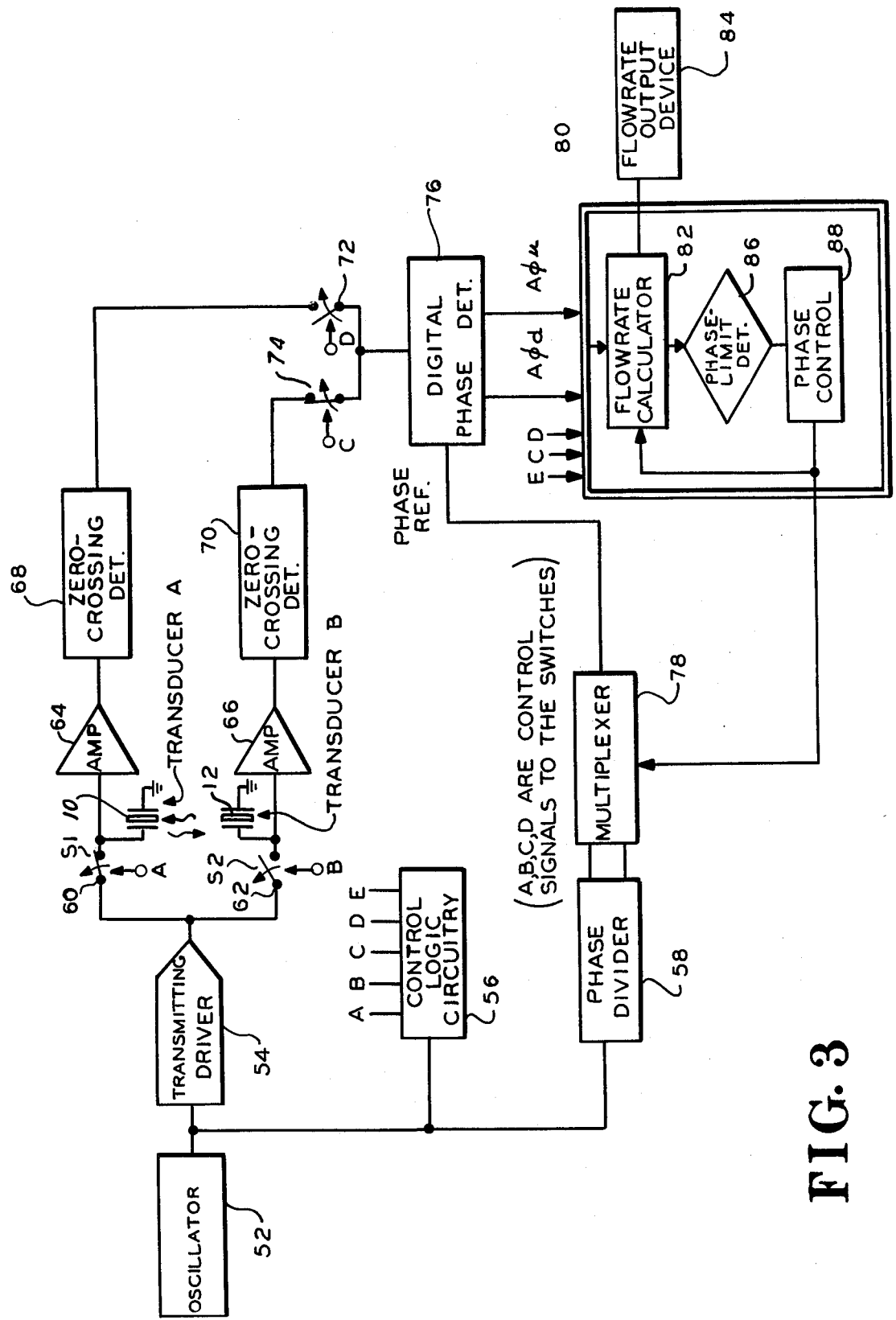
FIG. 3 is a block schematic circuit diagram of the circuitry used to carry out the invention.

Turning now to FIGS. 3 and 4, the electronic circuitry of FIG. 3 is exemplified by the wave forms of signals depicted in FIG. 4.

In FIG. 3 there is shown a schematic diagram of the electronic circuitry used with the present invention and including an oscillator 52 that provides a square wave of predetermined frequency. In the preferred embodiment to be explained, a crystal controlled oscillator is used and which generates a square wave signal at 100 kHz for driving the preferred ultrasonic transducer. The oscillator 52 provides the square wave signal to a transmitting driver 54 which amplifies that signal to the necessary amplitude and power requirements to drive the transducer. Oscillator 52 also provides the square wave signal both to the control logic circuitry 56 that generates a series of timed pulses that will be later explained and also to phase divider 58. The signal from the transmitting driver 54 powers the ultrasonic transducer assembies 10 and 12 (note FIG. 1). As shown in FIG. 1, the transducer assembly 10 sends the ultrasound in the downstream direction of the gas being analyzed while the transducer assembly 12 sends its ultrasound in the upstream direction of such gas. Switches 60 and 62 control the signal from transmitting driver 54 to, respectively, transducer assemblies 10 and 12.

As the transducer assemblies 10 and 12 act, alternately as receivers, the signal from one of those transducers assemblies is amplified, respectively, by amplifiers 64 and 66 and fed into zero crossing detectors 68 and 70 where the sinusoidal signal shape from the amplifiers 64 and 66 is reshaped into a square pulse train. A further set of switches 72 and 74 receives the signal from each of the zero crossing detectors 68 and 70 and, when one of the switches 72 or 74 is in the closed position, feeds the signal into a digital phase detector 76 for phase determination. The digital phase detector 76 compares the phase of the signals from zero crossing detectors 68 and 70 with a phase reference provided by multiplexer 78 as will be explained. By comparing the phase angle of the signals from zero crossing detectors 68 and 70 with the phase reference from multiplexer 78, a $\Delta\phi$ is determined by the digital phase detector 76 for both a downstream direction, i.e. when transducer assembly 10 is transmitting and an upstream direction, i.e. when transducer assembly 12 is transmitting.

Those values of $\Delta\phi_u$ and $\Delta\phi_d$ are those fed into the microprocessor 80 which perform several functions.

First, by recognizing the values of $\Delta\phi_u$ and $\Delta\phi_d$, the microprocessor 80 can utilize the equation:

$$u = \frac{\pi L f(\Delta\phi_u - \Delta\phi_d)}{\cos\theta(\Delta\phi_u + 2n\pi)(\Delta\phi_d + 2n\pi)}$$

to determine the flow velocity, the other parameters of the equation being known, in this instance, f is the operating frequency (100 kHz) L is the effective transducer separation and $\theta$ is the tilt angle of the transducer assemblies 10 and 12 to the main axis of the flowing gas. That flow rate calculation can thus be calculated by the flow rate calculator 82 and the result provided to a read out device such as flowrate output device 84 where a visual indication of the flow velocity may be readily viewed by the user.

Microprocessor 80 also, however, determines an average $\Delta\phi_u$ and $\Delta\phi_d$ to be used to change the phase reference provided by multiplexer 78 to the digital phase detector 76. In the case of zero flow, the upstream phase change and downstream phase change will be the same and depend upon the composition of the gas being detected. As will be explained, when there is flow, the average of the two variables $\Delta\phi_u$ and $\Delta\phi_d$ is therefore computed by microprocessor 80, and, as that average value reaches a predetermined limit, it is sensed by the phase limit detector 86 and a change made in the phase reference by phase control 88 so that the multiplexer 78 provides a different phase reference to the digital phase detector 76 to provide the phase shift comparisons with signals from zero crossing detectors 68 and 70.

Taking the foregoing explanation into account, FIG. 4 shows the wave form of the various signals involved in the circuitry.

FIG. 4 shows the wave form for the signals A, B, C, D, and E which are generated by the control logic circuitry 56 from the pulses from oscillator 52.

As an example of its operation, signal A is generated and controls the closing of switch 60, thus activating transducer assembly 10 as a transmitter of ultrasound through the gas stream in the downstream direction to transducer assembly 12 which acts, during this time, as a receiver. As can be seen in FIG. 4, the length of such signal may be about 100$\mu$ sec., thus the square wave pulse from transmitting driver 54 at or about the resonant frequency of the particular transducer, actuates the same. At the same time, switch 62 is open and thus the transducer assembly 12 is in the proper condition to receive the sound waves. At the end of the duration of signal A, 100$\mu$ sec., the switch 60 is opened to avoid electrostatic coupling between the transducer assemblies 10 and 12 which could cause distortion in the function of transducer assembly 12 acting as a receiver.

As shown in FIG. 4, wave form "Received Signal," due to the ringing characteristics of the receiving ultrasonic transducer assembly 12, it takes between 10–15 cycles before the transducer assembly 12 fully responds to the signal from transmitting transducer assembly 10. The Received Signal of FIG. 4, is characterized by a "wave front" region with gradually rising amplitude. The rising amplitude reaches a peak value at about the 12th cycle and the amplitude thereafter gradually diminishes.

In order to obtain an accurate signal from the transmitted ultrasound, it is important to analyze the received signal at its wave front region since the sound in that region is dominently the direct fly-over sound waves from the transmitting transducer. The later portion of the signal is subject to significant interference from sound waves reflecting off the interior walls of the conduit 14, residual ringing of the transducer and echo effects between the transducers.

The received signal from transducer assembly 12 is thereafter amplified by amplifier 66 and shaped to a square pulse-train by zero crossing detector 70.

In order to only select the direct fly-over or wave front portion of the signal from zero crossing detector 70, the switch 74 is closed only during the time that those predetermined cycles are available. Thus, the control logic circuitry 56 sends signal C to close switch 74 only during certain cycles, preferably cycle 6 to about cycle 10, thereby only allowing signals occurring during a window of a specific time period to reach the digital phase detector 76.

As may now be apparent from wave forms B and D of FIG. 4, the transducer assemblies 10 and 12 alternate at specified times. Thus, when the receiving transducer assembly 12 no longer receives a viable signal, and at a predetermined time interval, the control logic circuitry 56 provides signal B to close switch 62, thus allowing the 100 kHz signal from transmitting driver 54 to switch transducer assembly 12 into the transmitting mode, and, conversely, since switch 60 is open, the transducer assembly 10 is in the receiving mode. By reference again to FIG. 1, the ultrasound pulse is thus being transmitted upstream with respect to the direction of gas flow within conduit 14.

Again, only a portion of the signal from zero crossing detector 68 is allowed to be received by digital phase detector 76 by a window established by signal D from the control logic circuitry 56 closing switch 72.

The digital phase detector 76 receives, alternately, the selected square pulse waves from zero crossing detectors 68 and 70 and determines a $\Delta\phi_d$ and $\Delta\phi_u$ by comparing the phase angles of those signals with a phase reference. The phase reference is initially derived from phase divider 58 which divides the output from oscillator 52 into equal pulses with phases 360°/N apart from each other, with N being the number of divisions. In the preferred embodiment, the phase divider 58 divides the signal from oscillator 52 into two square waves, 180° apart. The rising edge of the square wave from phase divider 58 is thus used by the digital phase detector 76 as a 0° phase reference to be compared with the upstream and downstream phase angles derived from zero crossing detector 70 and 68 respectively, to obtain $\Delta\phi_u$ and $\Delta\phi_d$ and those values supplied to microprocessor 80.

The microprocessor 80, in turn, in its flowrate calculator 82, takes the signals representing $\Delta\phi_u$ and $\Delta\phi_d$ for use in the aforedescribed equation to derive flow velocity. A further signal E from control logic circuitry 56 (see FIG. 4) is high when transducer assembly 10 is transmitting and is low when transducer 12 is in the receiving mode. Thus the microprocessor 80 knows whether the sampled from digital phase detector 76 is from an upstream sample or a downstream sample.

As previously outlined, the microprocessor 80 also provides a shifting function for the phase reference used by the digital phase detector 76 to determine $\Delta\phi_u$ and $\Delta\phi_d$. At no flow, $\Delta\phi_u$ and $\Delta\phi_d$ are equal but the exact value of each is a function of the gas composition being analyzed or detected. As the gas composition changes, the velocity of sound through the gas also changes.

Assuming an example where conduit 14 is initially filled with air and a predetermined phase reference is chosen by the microprocessor 80 to give a zero flow phase of 170°. When the conduit is filled with oxygen, sound travels slower in oxygen and the zero flow phase will increase if the phase reference to the digital phase detector 76 is not changed.

In the present system, the zero flow phase in oxygen will increase about 145° and the zero flow phase would thus be 170° + 145° or about 315°. By detecting the approach of the present phase toward the predetermined phase limit the phase limit detector 86 can thus alert phase control 88 and select a different phase reference which subtracts 180° from the new zero flow phase, i.e. 315° − 180° = 135° and therefore, ambiguity as the zero flow phase approaches 360° can always be avoided.

At conditions when there is actual flow in conduit 14, the phase angle of $\Delta\phi_u$ increases while that of $\Delta\phi_d$ decreases. At such flow, a zero flow phase still can be approximately calculated by taking the average of $\Delta\phi_u$ and $\Delta\phi_d$ and using that value to determine the phase reference used by digital phase detector 76.

At any time, therefore that the zero flow phase approaches 360°, the microprocessor 80 will change the phase reference to the digital phase detector 76 to avoid ambiguity which occurs at 360°. As an example, assume a zero flow phase of 358° (the value may be truly at no flow or an averaged value of $\Delta\phi_u$ and $\Delta\phi_d$ under flow conditions). When there is flow or flow increases, $\Delta\phi_u$ will increase while $\Delta\phi_d$ will decrease from the zero flow phase value. If that increase/decrease is about 10°, $\Delta\phi_u$ becomes 368° and $\Delta\phi_d$ becomes 348° and $\Delta\phi_u - \Delta\phi_d = 20°$. Without a change in phase reference, the digital phase detector 76 would detect the 368° value as 8° and would make $\Delta\phi_u - \Delta\phi_d = -340°$, an intolerable inaccuracy.

To avoid that ambiguity, the microprocessor 80 calculates the zero flow phase at every data sampling time by calculating the average $\Delta\phi_u$ and $\Delta\phi_d$. That zero flow phase is then compared to a predetermined limit by phase limit detector 86 at, say 90° and 270°. At any time the calculated zero flow phase exceeds the predetermined limit, the phase control 88 changes the phase reference used by digital phase detector 76 by adding or taking away 180° through phase divider 58 and multiplexer 78. The microprocessor 80 remembers the phase alteration it makes and thus corrects itself in its determining the value of $2n\pi$ in the denominator of the equation used to calculate flow velocity, that is each phase correction corresponds to a connection of 180° or $\pi$, thus any ambiguity is completely avoided.

We claim:

1. An ultrasonic flowmeter comprising:
   a pair of transducers mounted about a conduit carrying a gas coaxially aligned at a predetermined spacing apart and at an angle with respect to the direction of flow of the gas;
   means to activate one of said transducers at a predetermined frequency to generate an ultrasonic signal in a direction upstream of the flow of gas and received by the other of said transducers;
   means to activate the other of said transducers at a predetermined frequency to generate an ultrasonic signal in a direction downstream of the flow of gas and received by the one of said transducers;
   means to establish a phase reference based upon the activation of the generation of the ultrasonic signal;
   means to compare the received ultrasonic signals with said phase reference to determine a phase angle of ultrasonic signals travelling in both the upstream and downstream directions and to produce a signal indicative of the flow velocity of the gas based upon the difference in detected phase angles;
   means to compute the average of the detected phase angles of the ultrasonic signals traveling in both the upstream and downstream directions;
   means to sense the approach of the averaged phase angle to a predetermined limit and to shift the phase reference to a new value to prevent the averaged phase angle from reaching the predetermined limit;
   means to memorize the amount of shift in phase reference and to use the same in producing the signal indicative of flow velocity.

2. An ultrasonic flowmeter according to claim 1, wherein said means to detect the phase angle samples only a predetermined part of said received ultrasonic signal.

3. An ultrasonic flowmeter according to claim 2, wherein said predetermined part comprises the wave front of said received ultrasonic signal.

4. An ultrasonic flowmeter according to claim 1, wherein a fixed timing pulse means generates a uniform electrical signal for activating said transducers and for establishing said phase reference.

5. A method of measuring flow velocity of a gas comprising the steps of:
   a. transmitting a first ultrasonic signal through said gas from a first transducer to a second transducer along a path at an angle to the flow of the gas in an upstream direction of the flow of the gas;
   b. transmitting a second ultrasonic signal from the second transducer to the first transducer along the same path but in the opposite direction as said first ultrasonic signal;
   c. establishing a phase reference based upon the transmitting of the ultrasonic signals;
   d. comparing the received ultrasonic signals with said phase reference and determining the phase angle of the first and second ultrasonic signals to produce a signal indicative of the flow velocity of the gas based upon the difference in detected phase angles of the first and second ultrasonic signals;
   e. mathematically calculating the average phase angles of the first and second ultrasonic signals;
   f. sensing the approach of the averaged phase angle to a predetermined limit and shifting the phase reference to a new value to prevent the averaged phase angle from reaching the predetermined limit;
   g. memorizing and storing the amount of shift in phase reference for use in producing the signal indicative of flow velocity of the gas.

* * * * *